United States Patent
McKee et al.

(10) Patent No.: US 7,805,464 B2
(45) Date of Patent: Sep. 28, 2010

(54) WEB VIEWER SETUP DIALOG AND GRAMMAR FOR GENERATING WEB ADDRESSES

(75) Inventors: David McKee, Tracy, CA (US); Tom Lloyd, San Francisco, CA (US); John Lorin Welshofer, Sunnyvale, CA (US); Christopher Crim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 449 days.

(21) Appl. No.: 11/523,378

(22) Filed: Sep. 18, 2006

(65) Prior Publication Data
US 2008/0071790 A1    Mar. 20, 2008

(51) Int. Cl.
*G06F 17/30* (2006.01)
(52) U.S. Cl. .................. 707/804; 709/245; 715/258
(58) Field of Classification Search .................. 707/804
See application file for complete search history.

(56) References Cited

U.S. PATENT DOCUMENTS 5,999,914 A * 12/1999 Blinn et al. .................... 705/26
6,026,433 A * 2/2000 D'Arlach et al. ............. 709/217
6,219,680 B1 * 4/2001 Bernardo et al. ............ 715/234
6,560,639 B1 * 5/2003 Dan et al. .................... 709/218
2002/0143821 A1 * 10/2002 Jakubowski ................. 707/522
2003/0120599 A1 * 6/2003 Agboatwalla et al. ......... 705/50
2005/0235042 A1 * 10/2005 Rumaner et al. ............ 709/216
2006/0236253 A1 * 10/2006 Gusmorino et al. ......... 715/762

OTHER PUBLICATIONS

"Dynamically generating Web Application Fragments from Page Templates", Uwe Zdun, pp. 1113-1120, 2002,, http://portal.acm.org/citation.cfm?id=509010&coll=GUIDE&dl=GUIDE&CFID=61258376&CFTOKEN=80838515&ret=1#Fulltext.*

* cited by examiner

*Primary Examiner*—Neveen Abel Jalil
*Assistant Examiner*—Kellye D Buckingham
(74) *Attorney, Agent, or Firm*—Fish & Richardson P.C.

(57) ABSTRACT

A setup dialog for a web viewer dynamically changes to reflect parameters needed to generate a web address. The setup dialog can include a list box containing websites for which website templates are available for assisting the user in generating web addresses. The list box can also include an option to generate a custom web address without using a website template. An extensible grammar is provided for generating custom website templates.

18 Claims, 9 Drawing Sheets

WEB VIEWER SETUP DIALOG AND GRAMMAR FOR GENERATING WEB ADDRESSES

TECHNICAL FIELD

The subject matter of this patent application is generally related to user interfaces for computer applications.

BACKGROUND

Many websites build dynamic web pages based on parameters embedded in a dynamic web address, which is also referred to as a dynamic Uniform Resource Locator (URL). These parameters are included in the URL to retrieve desired information (e.g., stock quotes, catalog items). Some examples of websites that build dynamic web pages include but are not limited to: Google™ Search, Yahoo!® Finance Stock Lookup, Google™ Maps, FedEx® Tracker, Amazon®, etc.

Building a dynamic URL is typically a manual process performed by sophisticated computer programmers, and may require the programmer to define calculated expressions for building the URLs. Unfortunately, defining calculated expressions for building dynamic URLs can be a daunting process for average users.

SUMMARY

A setup dialog for a web viewer dynamically changes to reflect parameters needed to generate a web address. The setup dialog can include a list box containing websites for which website templates are available for assisting the user in generating web addresses. The list box can also include an option to generate a custom web address without using a website template. An extensible grammar is provided for generating custom website templates.

In some implementations, a method includes: presenting a setup dialog; receiving a first input through the setup dialog, the first input specifying a website for which a website template is available for building a web address for the website; determining a parameter of the web address based on the website template; presenting the parameter in the setup dialog; receiving a second input through the setup dialog, the second input specifying a value for the parameter; and generating the web address with the specified value.

Other implementations of a web viewer setup dialog and grammar for generating web addresses are disclosed, including implementations directed to systems, methods, apparatuses, computer-readable mediums and user interfaces.

DETAILED DESCRIPTION

User Interface Descriptions

Figure 1:
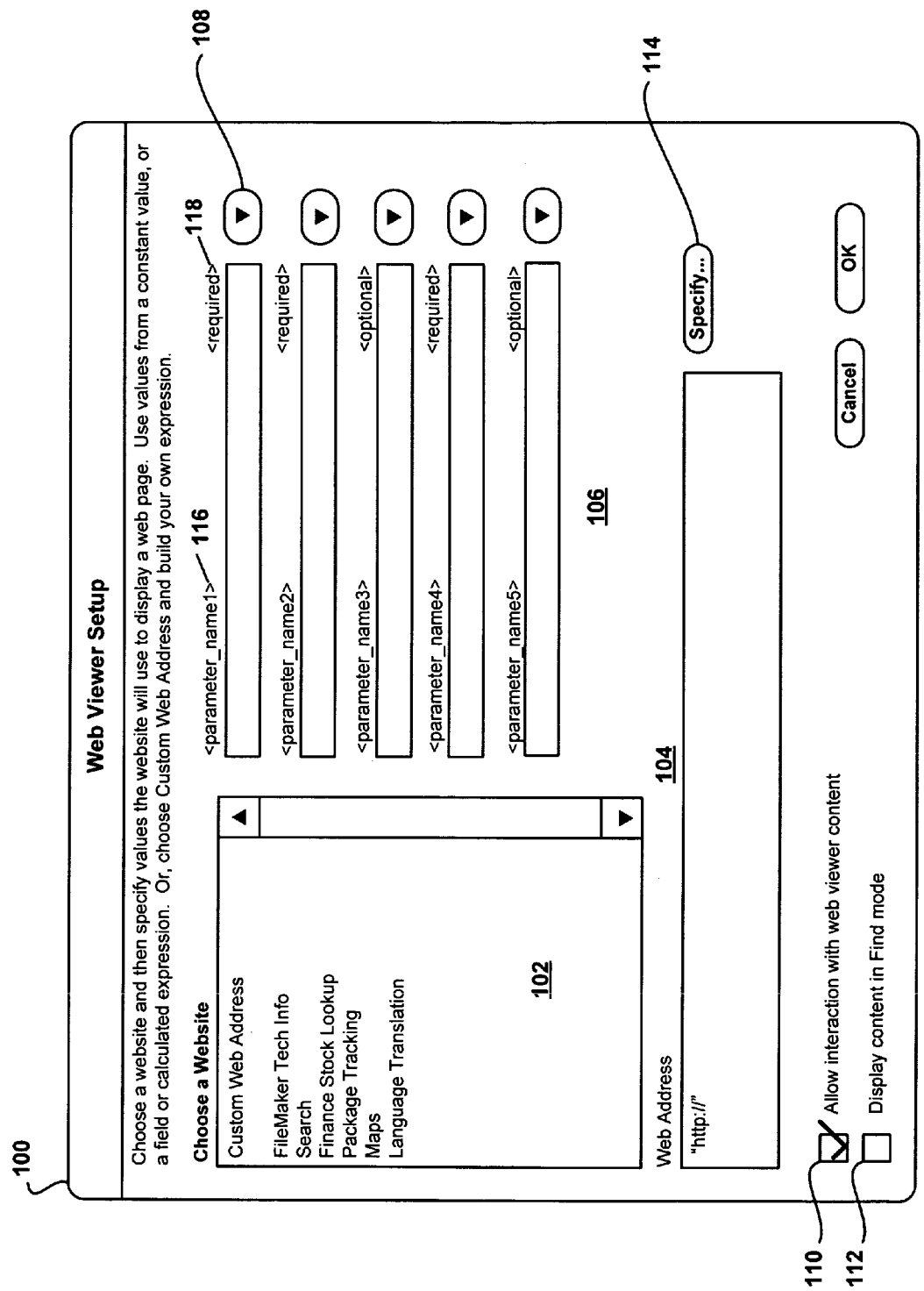
FIG. 1 illustrates an implementation of a web viewer setup dialog.

FIG. 1 illustrates an implementation of a web viewer setup dialog 100. A web viewer is generally a browser that is integrated with another application, such as a database development tool (e.g., FileMaker®). Generally, the web viewer provides a user interface with various controls for allowing users to access websites and view web page content. In some implementations, the setup dialog 100 can be presented when a user defines a web viewer object on a layout. The setup dialog 100 allows users to specify a URL for a web viewer object and populate URL parameters with values, conditions, record fields and/or expressions.

Many useful websites are "data-driven" in that they generate dynamic web pages based on one or more parameters embedded in a URL supplied by a requester. URLs generally include a "URL stem" which is a constant or static part of the URL that is typically located at the beginning of a string. For example, a URL stem for a map website could be in the form of www.map.com/maps/map.adp?.

The values of the parameters in typical dynamic URLs are the result of text typed into web-forms creating a specific unique URL. Examples of URL parameters include but are not limited to: an address for a map website, a stock symbol for a stock lookup, a catalog number for a bookstore website, etc. In database development applications, users can specify their own parameters, such as field values from a database record. The parameters can be identified in the URL by using a parameter identifier string. A parameter identifier string can be any constant string in the URL that identifies a specific parameter. For example, the value of a street address parameter in a mapping website setup dialog can be prefaced with the constant string &address=, where the &address part is the parameter identifier string.

Referring to FIG. 1, in some implementations the setup dialog 100 includes a list box 102, a web address edit box 104, one or more parameter edit boxes 106, specify field or calculation dialog buttons 108 corresponding to the parameter edit boxes 106, control check boxes 110 and 112, a specify calculation dialog button 114, a parameter name label 116 and a required/optional label 118. The list box 102 includes a list of websites for which a website template is available. Each website template is associated with a website in the list box 102 and provides a starting point for building a URL for the website. In the example shown, the list box 102 includes a FileMaker® technical information website, a search website, a finance stock lookup website, a package tracking website, a map website and a language translation website. These websites are examples; other websites are possible with corresponding templates. Each of these websites can be accessed by a dynamic URL that includes one or more parameters that can be supplied by users requesting access to the website. For example, the map website URL can include parameters for street address, city, state/province and ZIP/postal code, as described with reference to FIG. 2a.

In some implementations, the list box 102 also includes a custom web address option, which allows a user to construct a custom URL, as described with reference to FIG. 3. The selection of websites presented in list box 102 and presentation order can be determined by the order in which the website templates are listed in a website template file, as described with reference to Table I. For example, in the source that defines the templates, specifying the template for Search before the template for Financial Stock lookup will result in that same order in the list box 102 displayed to the user.

FIG. 1 illustrates a setup dialog "schematic" in that it shows the various components of a generic setup dialog before a website is selected from the list box 102. There can be explanatory text at the top of the setup dialog 100 that instructs the user on how to interact with the setup dialog 100. In this implementation, the check box 110 controls how the user will interact with the resulting web page (not shown) that is displayed. If checked, the web page will be interactive similar to how it would be in a web browser. For example, any links embedded in the web page will be active. In this implementation, there are five parameter edit boxes 106, each of which is associated with a specify field dialog button 108. More or fewer parameter edit boxes 106 can be presented based on the number of parameters specified in the template for the corresponding website. Each parameter edit box 106 also has a label 116 for naming the parameter and a label 118 for indicating whether the parameter is required or optional for the URL. The labels 116, 118 can be localized to a specific language (e.g., English, Spanish).

For database development tool applications, the setup dialog 100 can be initially presented to the user when the web viewer is first defined in a layout. In some implementations, the number of parameter edit boxes that can be displayed are stored in a website template file. If only two parameters are needed for a URL, then only two parameter edit boxes 106 need be presented. Any controls (e.g., controls 106, 108, 116, 118) that are included in a given website template can be enabled when the website is selected.

Figure 2A:
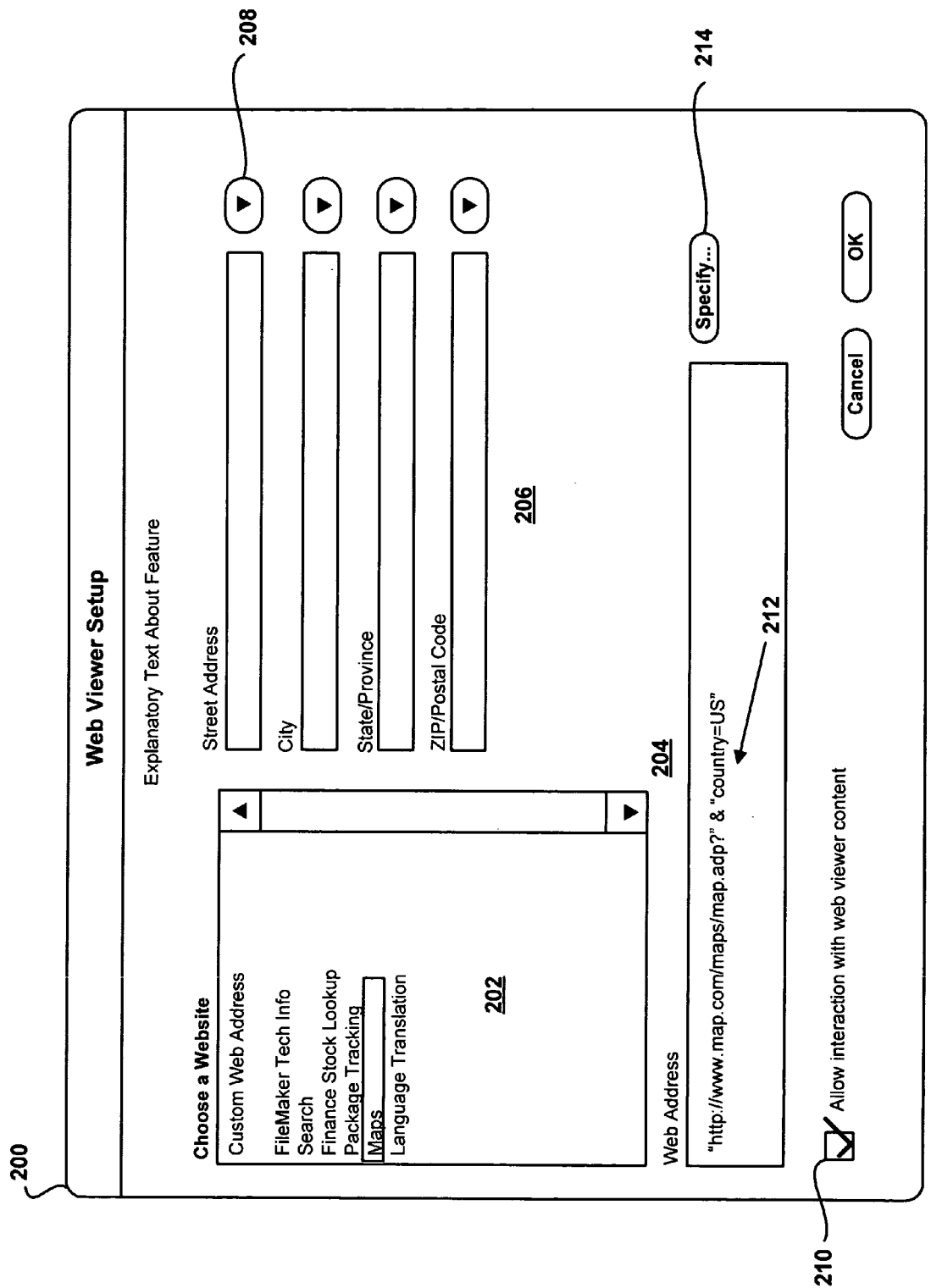
FIG. 2a illustrates an implementation of a web viewer setup dialog with a website template for a map website selected.
Figure 2B:
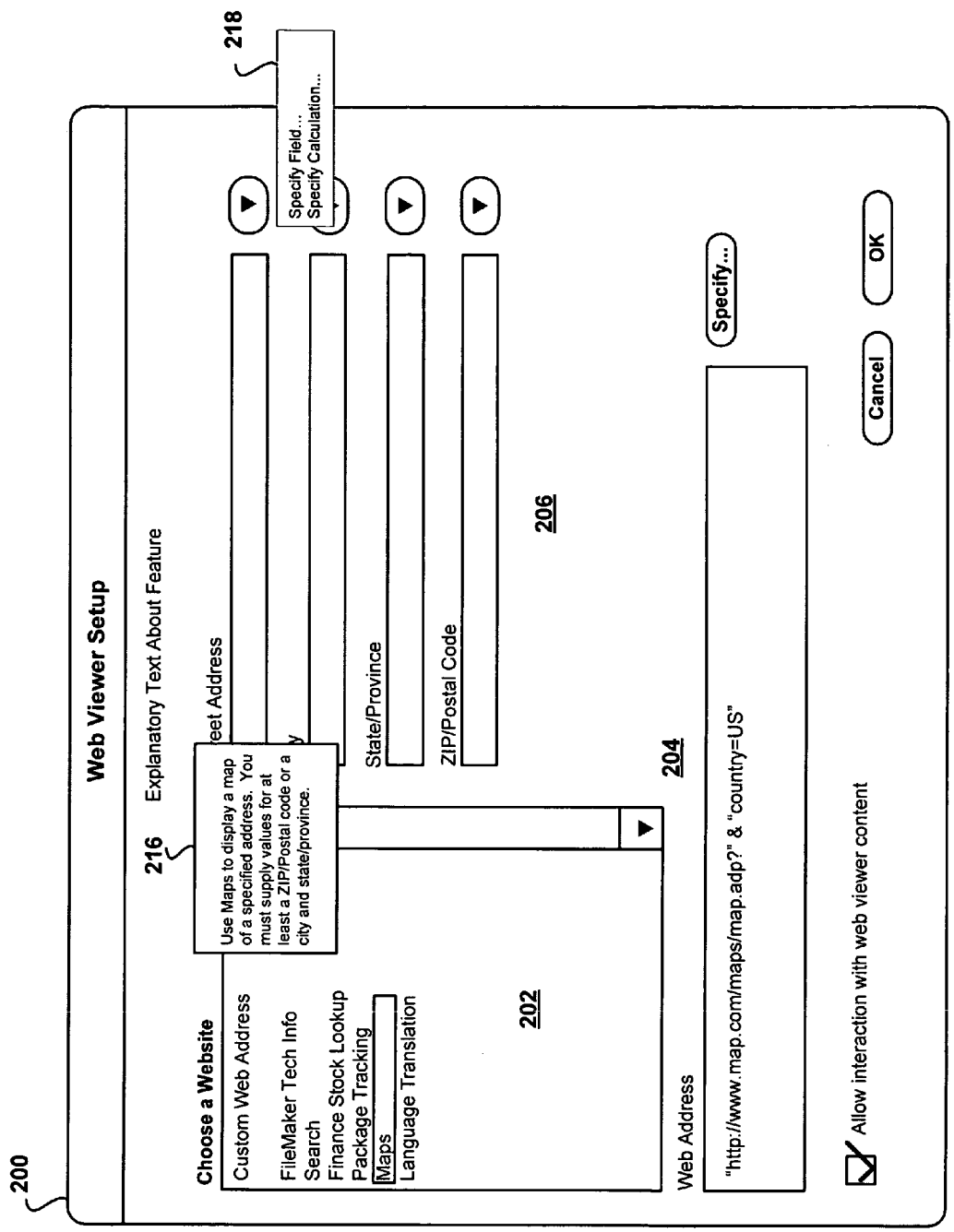
FIG. 2b is the web viewer setup dialog of FIG. 2a, including user interface elements for displaying instructions.

FIG. 2a illustrates an implementation of a web viewer setup dialog 200 with a map website template selected. The setup dialog 200 includes a list box 202 containing websites for which website templates are available, and parameter edit boxes 206 (specified in the map website template) for street address, city, state/province and ZIP/postal. When the user interacts with the list box 202 (e.g., a mouse over), text, images or other content can be displayed in the setup dialog 200, as shown in FIG. 2b. As shown in FIG. 2b, a display pane 216 is presented when the user hovers a mouse (or other pointing device) over a website name in the list box 202 that presents context-sensitive information about that website. A drop-down menu 218 or other user interface element (e.g., a help balloon) can be presented when the button 218 is activated by a user.

In some implementations, when the user selects a new website from the list box 202, the previous contents of the web address edit box 204 (if any) are discarded and replaced with a "template" for the calculated expression 212 for the website URL. The template calculation expression 212 can include a stem plus other elements of the template, such as string literals and parameters marked "alwaysPresent" (see Table I). Any values, expressions or fields entered in the parameter edit boxes 206 are added to the calculated expression 212 to build the map website URL. As the user fills the parameter edit boxes 206 the entries appear in the web address edit box 204 as part of the calculated expression 212, thus allowing the user to see the URL being built. The user can manually edit the "under construction" URL in the web address edit box 204. If a website template is used to build a URL, then that template can be persistent to the web viewer object on the database layout, so that if the setup dialog 200 is closed and re-opened, the originally selected website template is re-selected, provided the calculated expression 212 for the website URL is not changed significantly by the user.

In the example shown, the web address edit box 204 contains a calculated expression and not an actual URL that a user could paste into a browser. As the calculated expression is built, its individual parts are concatenated with an operator, which in this example is the FileMaker® concatenation operator, "&." Other choices for concatenation operators are possible.

In some implementations, a click on a website in the list box 202 (other than "Custom Web Address") will clear the web address edit box 204 and insert a template for the calculated expression 212 for the currently selected website. In general, the web address edit box contains a "master copy" of the calculated expression 212 desired by the user. For example, when the setup dialog 200 is re-opened, the calculated expression 212 is presented in the web address edit box 204 first, and the list box 202 and parameter edit boxes 206 derive their values from the calculated expression 212 in the web address edit box 204. That is, the parameters of the URL can be dynamically derived from the calculated expression 212 in the web address edit box 204 and presented in the corresponding parameter edit boxes 206. For example, when an expression is typed by a user in the web address edit box 204, the parameters of the expression are continuously parsed and extracted, allowing the parameters to be reflected in real time in the parameter edit boxes 206. Conversely, as a user types in the parameter boxes 206, the web address edit box 204 is populated with parameters in real time.

In some implementations, the calculated expression 212 is broken down into its component pieces (e.g., the stem and the parameters (label, value)). The calculated expression 212 is transformed into polish prefix notation represented as an expression tree. The list of parameters used in the calculated expression 212 are then determined from the top level branches of the expression tree. The order of the parameters in the expression tree are matched to counterpart parameters in an XML definition stored in an XML file (see Table I). The values from the matching parameters from the expression tree are then placed within the corresponding edit boxes 206 in the setup dialog 200. When the user clicks the OK button in the setup dialog 200, the calculated expression 212 in the web address edit box 204 is saved.

Figure 2C:
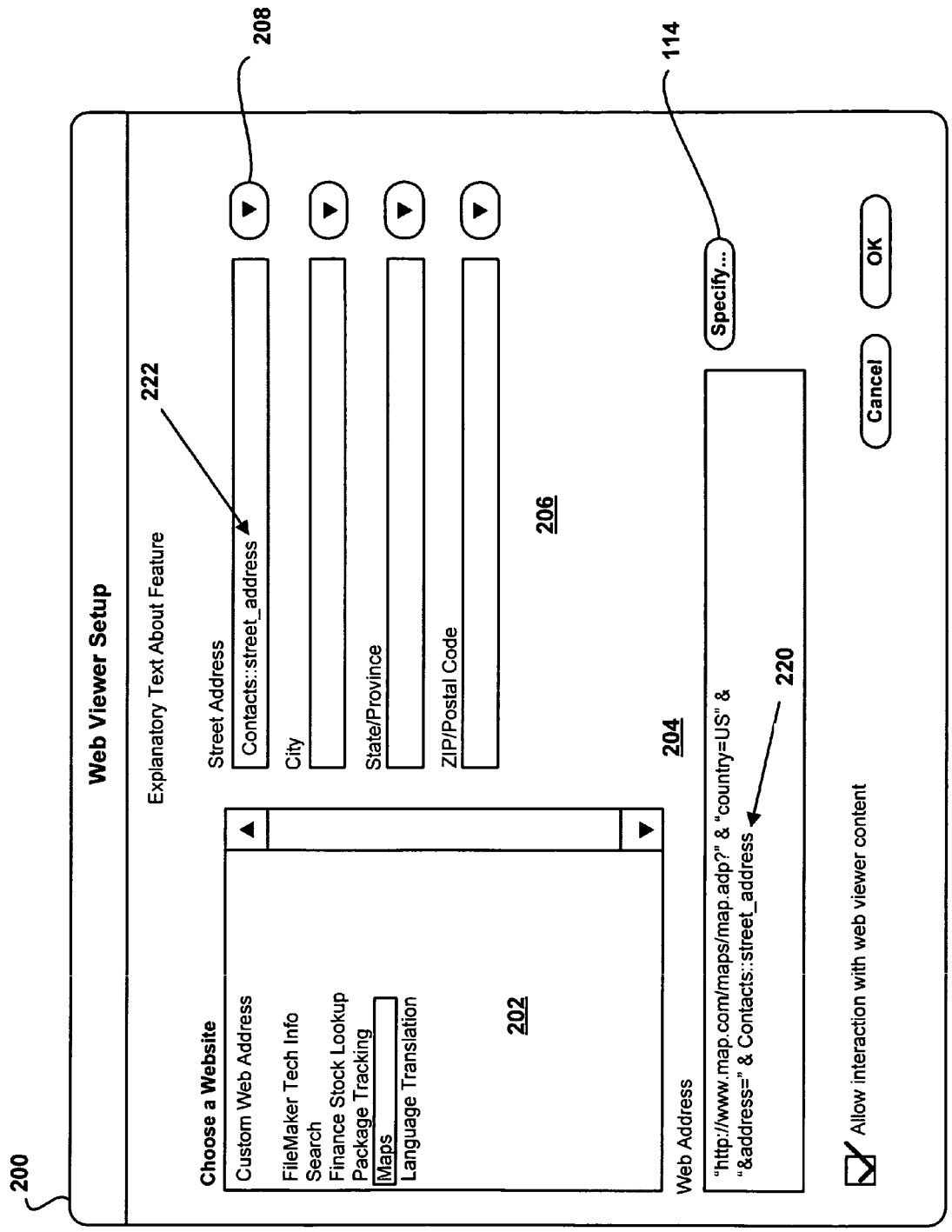
FIG. 2c is the web viewer setup dialog of FIG. 2a, including the specification of a database record field for a first web address parameter.

FIG. 2c is the web viewer setup dialog 200 of FIG. 2a, including the specification of a database record field for a first web address parameter. In the example shown, the user has selected the maps website. In response to selection of the maps website the setup dialog 200 reflects the parameters associated with the maps website URL. The user clicks the button 208 to choose whether to enter a specify calculation dialog or a specify field dialog. If the user chooses the specify field dialog, the user enters a specify field dialog and is presented with a list of fields in the database. In the example shown, the user selects a "Contacts::street_address" field 222 from the specify field dialog. In response to the selection, a parameter string "&address=" and the "Contacts::street_address" field 222 are concatenated to the calculated expression 220 using the concatenation operator "&". The calculated expression 220 in web address edit box 204 now has the form

```
http://www.map.com/maps.adp?&"country=US"
& "&address="& Contacts::street_address.
```

Figure 2D:
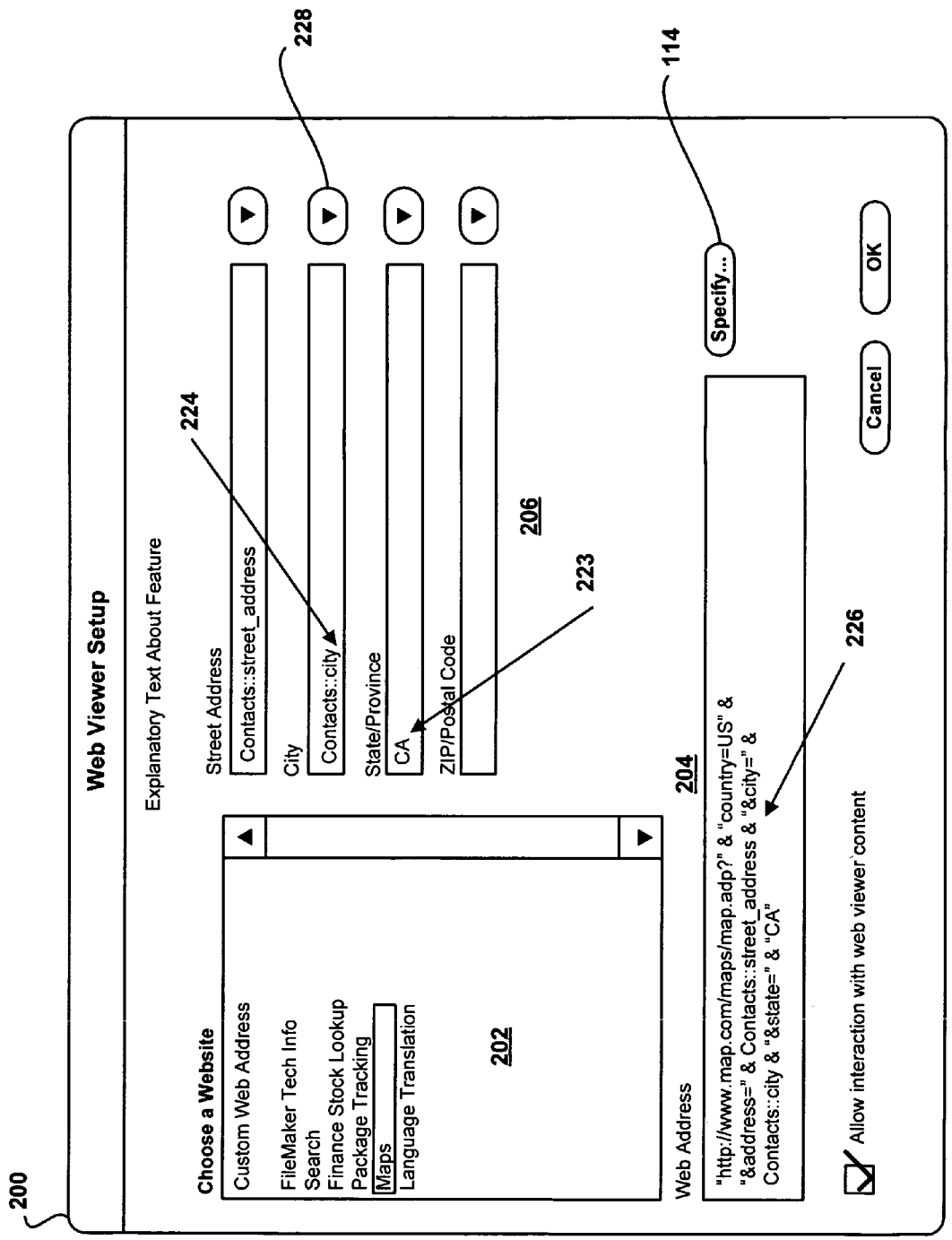
FIG. 2d is the web viewer setup dialog of FIG. 2a, including the specification of a database record field for a second web address parameter and a fixed value for a third web address parameter.

FIG. 2d is the web viewer setup dialog of FIG. 2a, including the specification of a database record field for a second web address parameter. The user selects the "Contacts::city" field 224 from a specify field dialog associated with the "City" URL parameter. In the example shown, the specify field dialog can be invoked by clicking the button 228. In response to the website selection, a corresponding parameter identifier string "&city=" and the "Contacts::city" field 224 are concatenated to the calculated expression 226 in the web address edit box 204 using the "&" concatenation operator. In addition, the user has entered the literal "CA" to the "State/Province" parameter edit box 206, which is also concatenated to the calculated expression 226, which now has the form

```
http://www.map.com/maps.adp?&"country=US"
&"&address="& Contacts::street_address
& "&city="& Contacts::city
& "&state="& "CA".
```

Note that when the text entry cursor/focus is moved from the State/Province parameter edit box 206, the text "CA" within the parameter edit box 206 is automatically quoted and included in the calculated expression 226.

Custom Web Address

Figure 3:
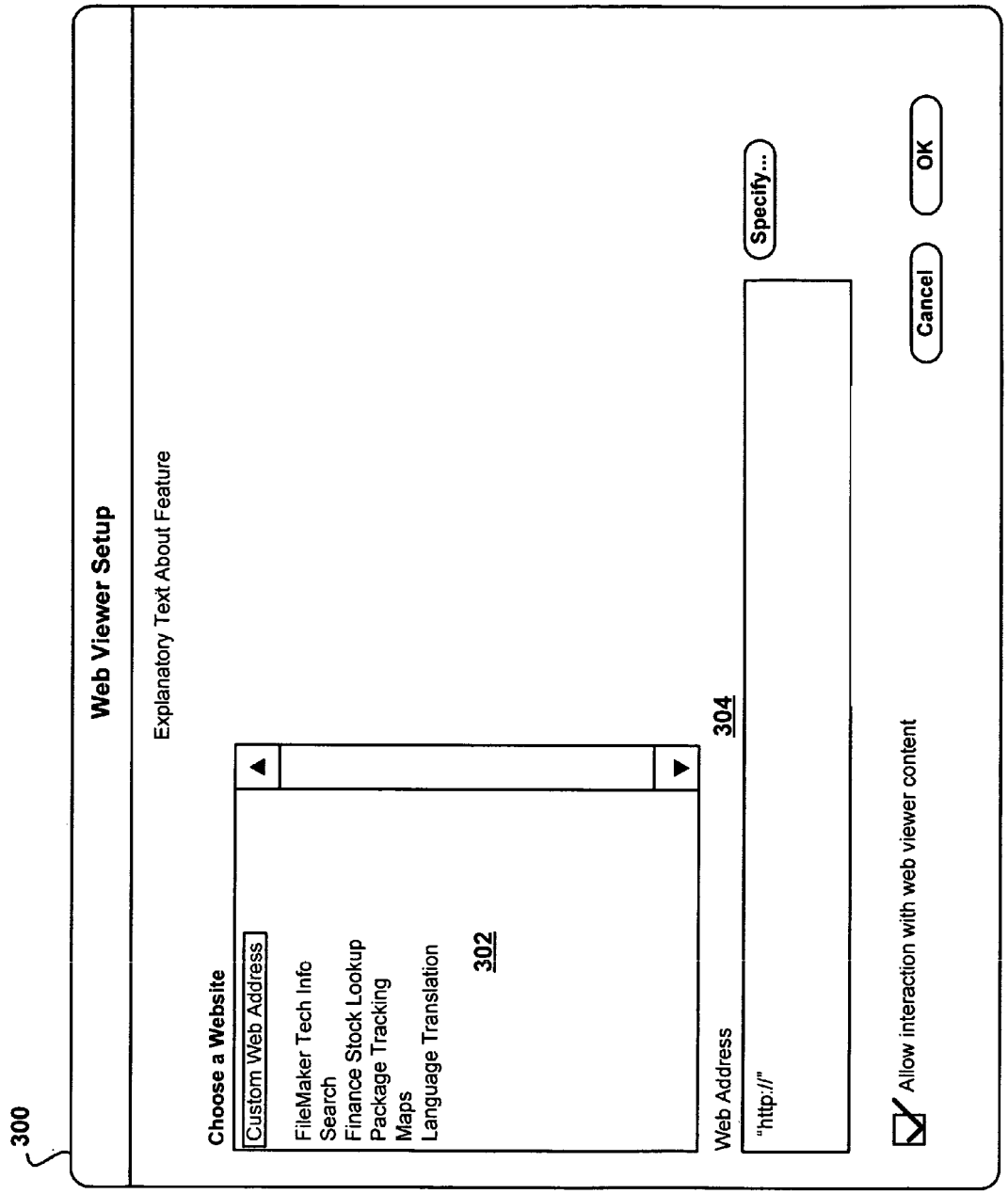
FIG. 3 illustrates an implementation of a web viewer setup dialog with a custom web address option selected.

FIG. 3 is an implementation of a web viewer setup dialog 300 with a custom web address option selected. The custom web address allows users to enter a calculated expression into the web address edit box 302 without working within a website template. When the user selects the "Custom Web Address" option from the list box 302, the user can build a custom calculated expression in the web address edit box 304 using custom parameters. The values in the expression can be literals, record fields, calculated expressions, etc. Note that for this option, the parameter edit boxes and associated labels and menu controls are hidden and the current calculated expression, if any, is presented in the web address edit box 304. If the user explicitly selected "Custom Web Address" in the list box 302, the selection can be remembered between setup dialog sessions, so that even if a custom calculation expression matches a particular website template, the "Custom Web Address" will be selected instead when the setup dialog is re-opened.

Figure 4:
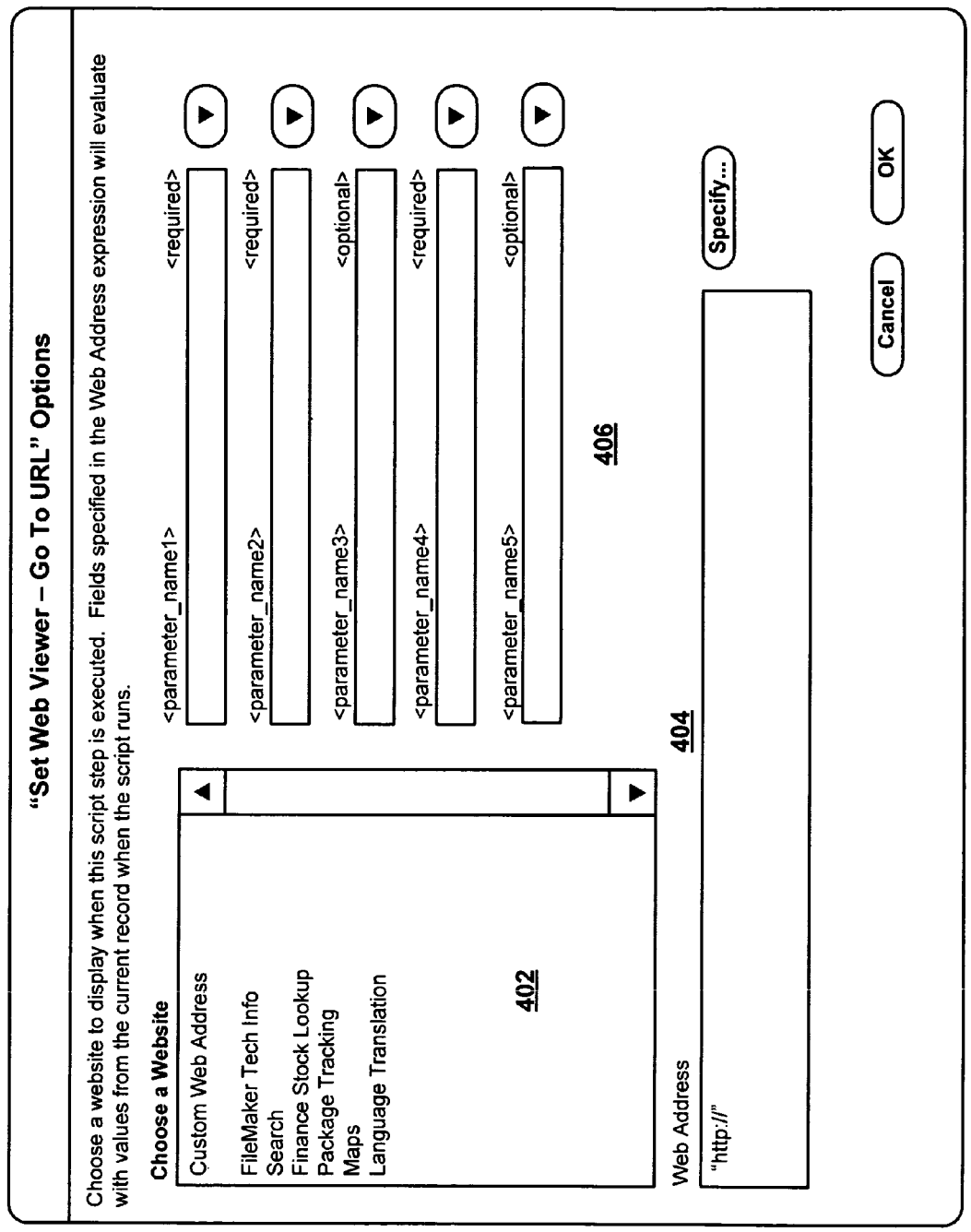
FIG. 4 illustrates an implementation of a web viewer setup dialog that can be invoked by a script.

FIG. 4 is an implementation of a web viewer setup dialog 400 that can be invoked by a script (e.g., a FileMaker® ScriptMaker® script). In some implementations, the setup dialog 400 can be invoked from a step in a script. For example, as part of a script a user may desire to display website content. For "data-driven" websites, a URL may need to be built for this purpose. In the example shown, the setup dialog 400 includes parameter edit boxes 406 that the user can specify values for either through a specify field dialog or by entering values, conditions or calculated expressions in the parameter edit boxes 406.

Web Viewer Setup Dialog Process

Figure 5:
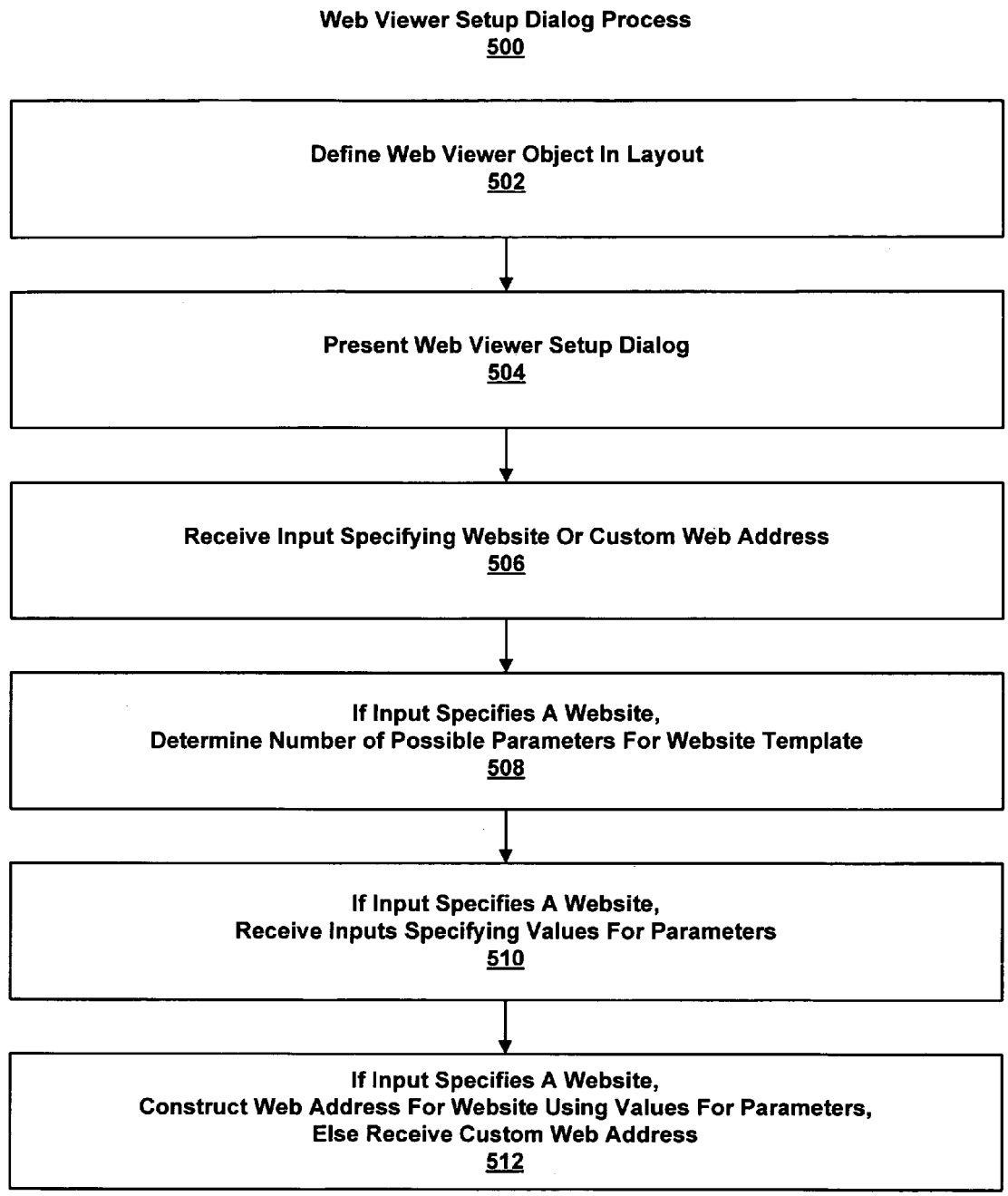
FIG. 5 is a flow diagram of an implementation of a web viewer setup dialog process.

FIG. 5 is a flow diagram of an implementation of a web viewer setup dialog process 500. The process 500 begins by the user defining a web viewer object in a layout (502). For example, with some database development tools, a user can place a web viewer control on a layout. The database designer can use a web viewer tool (e.g., presented in a Layout mode of FileMaker() and a mouse to draw out a bounding box in the layout. The bounding box defines the boundaries of the web viewer object in the layout. Step 502 is specific to a database development tool and may be omitted for other applications.

When the user places the web viewer object in the layout, the web viewer setup dialog is presented (504). The setup dialog includes a list box of websites for which website templates are available for building the website URL. The list box also includes a custom web address option. The user chooses a desired website or a custom web address option from the list box (506). If a website is chosen, the process 500 determines the number of possible parameters that the website needs to build its URL (508). The user chooses a record field value from a specify field dialog and/or directly enter a value, field or calculated expression (which may include using a static string) in a parameter edit box for each parameter (510). If the user is not using a website template, then the user can type a calculated expression directly into a web address edit box using, for example, a keyboard or other suitable input device. Otherwise, the user can click a button to open a specify calculation dialog, where a calculated expression for the URL is constructed (512). When the specify calculation dialog button is clicked, a dialog is presented that provides tools for building complex custom calculations from scratch, or tools for modifying a pre-generated calculated expression in a more structured way.

URL Encoding

URLs follow standard rules. One of these rules addresses what constitutes a "valid" URL. Valid URLs typically require a protocol, such as the convention "http://." Another more general URL rule dictates how to represent certain parts of a URL using "special characters" and what kind of characters must be "encoded" when used as data. This scheme is referred to as "URL Encoding."

Web browsers will sometimes make assumptions or break conventions of what can be typed into a Web Site address box. However, because a Web Viewer control may not be a full featured Web browser, and due to the myriad of possibilities that an application's calculation engine can provide, the text used for a URL for a web viewer should conform to specific rules. This is especially true, because for many solutions the URLs will vary from record to record.

Any Web Viewer object has an associated calculation formula, whose result will be used as a URL. Since the final result of the calculation could be inconsistent across records, in order for the web viewer and the underlying OS components to work properly the data should conform to two conventions. First, the final result of the calculation should form valid URLs, especially in the case of providing a protocol. Second, since the URL ultimately should be "URL Encoded," and the web viewer automatically encodes the calculation result, the calculation formula should provide text that is not encoded. For example, if your web viewer is based on a field called "web_server_address," with contents like "www.filemaker.com", the first convention requires that the calculation include a protocol:

"http://" & tablenamehere::web_server_address.

For worldwide interoperability, URLs should be encoded uniformly. To map the wide range of characters used worldwide into about 60 or more allowed characters in a URL, a two-step process can be used. First, the "encodable" characters can be converted into a sequence of bytes using, for example, UTF-8 encoding. Second, each UTF-8 byte can be converted into a three-character sequence, like % HH, where HH is a hexadecimal value of the byte. In some implementations, a web viewer can determine which characters are "encodable" based on the following rules:

Rule 1: The following characters will not be automatically encoded:
ABCDEFGHIJKLMNOPQRSTUVWXYZab-cdefghijklmnopqrstuvwxyz012345 6789-_.~!*( );:(@=+$,/?[ ]

Rule 2: If the character is an ampersand (&), it will be encoded only if a space follows it. (e.g., "& " will be encoded, but "&x" will not).

Rule 3: If the character is a pound sign (#), it will be encoded only if a number (0..9) character follows it.

Rule 4: Both backslash \and percent sign % will be encoded.

Rule 5: Any other character not mentioned in Rules 1-4 will be encoded.

The rules described above can be applied across multiple computing platforms (e.g., Mac® OS X and Windows® platforms). On a Windows® platform, a given "file://" URL can bypass the web viewer automatic encoding method described above and the text can be provided to the OS web component without encoding.

URL Grammar

In some implementations, it may be desirable to create custom website templates that can be accessed through a setup dialog. A URL grammar can be used for this purpose. For consistency, each website template can include a set of basic specifications. For example, each website template can have a title, explanatory text describing the website, a method for specifying static and dynamic syntax of the URL. In addition, each parameter of a URL can have a name, a status label to indicate whether the parameter is required or optional, and any other desired specification, such as whether the parameter should always be present in the URL. In some implementations, one or more sub-parameters (hereinafter also referred to as "virtual parameters") can also be included in the URL grammar. Other features can be added or removed from the specification of a website template, as desired.

The URL grammar can be implemented in any suitable language. For the implementation described below, Extensible Markup Language (XML) is used to implement the URL grammar (hereinafter also referred to as "XML grammar"). XML grammar can be stored in an XML file where it can be retrieved and used to configure a setup dialog in a web viewer.

Ideally, the grammar is concise and in some implementations can take the form of

[header]
    [single website url template #1]
    [single website url template #2]
    [single website url template #3]

In some implementations, three element tags are defined for a website URL template as follows:

1. <WebsiteURLTemplate> contains the entire template for a single website's URL.
2. <URLElement> specifies a specific part of the website URL, either a literal string or a parameter for the URL's common gateway interface (CGI). For this implementation, the <URLElement> tag has attributes for type, label, dialog display information, and for specifying how the parameter is found in F the URL. The tag also has contents that are specific to the type of URLElement, including allowing for one level of URLVirtualParameters.
3. <URLVirtualParameter> enables a template to represent several parameters in a setup dialog as a single parameter for a CGI. These virtual parameters can be combined together later as one parameter in the actual URL. This tag would have attributes for label and description but no content attribute.

The functionality of each of these tags is summarized in Table I below.

TABLE I

Examples of Element Tags and Attributes

| Element Tag Name | Element Value | Attribute Names | Attribute Values |
|---|---|---|---|
| <WebsiteURLTemplateList> | (content is a single level list of WebsiteURL Templates) | | The document container tag. |
| <WebsiteURLTemplate...> | (content is all of the URLElements, in order of assembly <WebsiteURLTemplateList> <WebsiteURLTemplate...> ... | | |
| | | Name | "website X" if missing, ignore template. |
| | | Description | "Website X is a web service offering..." |
| | | baseURL | http://www.websitex.com/... If missing, ignore template |
| | | parameterIndicator | "=" indicates what separates a parameter name from its value in a name/value pair (e.g., "price = 123") If "=" is missing, "=" is assumed. |
| | | parameterSeparator | "&" indicates what separates name/value pairs (the whole parameter), e.g., "price=123&location=santaclara" |

TABLE I-continued

Examples of Element Tags and Attributes

| Element Tag Name | Element Value | Attribute Names | Attribute Values |
|---|---|---|---|
| <URLElement...> | (Content: type=Literal, content is static text concatenated alongside other URLElements; type=Parameter, content is reserved and currently ignored; type=Virtual, content is a list of sub-parameters (URLVirtualParameter) in the dialog to be treated as a single parameter in the final resolved URL sent to the browser.)<br><WebsiteURLTemplateList><br>  <WebsiteURLTemplate...><br>    <URLElement..><br>    ... | | If "&" is missing, "&" is assumed.<br>(This element only resides as content within a WebsiteURLTemplate.) |
| | | type | "Literal" - this part of the url is unchanging static text within the url<br>"Parameter" - this part of the Url is a parameter for the cgi, shown with its own edit box in the dialog. Most cgi's will have individual parameters.<br>"Virtual" - this part of the url is a single parameter for the cgi, but the dialog must display it in pieces as if they were separate parameters. "Virtual"s should only be used when the cgi expects more than one kind of value in a single parameter.<br>If missing, assumes Literal. |
| | | label | Label representing the Name for the parameter edit in the dialog (e.g., "Location Address")- ignored for "Literal" and "Virtual"elements. This text should be in the appropriate language in the file, properly encoded. |
| | | userHint | A supplementary informational label associated with the parameter edit as a "hint" to the user. Usually this will be something like "Required" or "Optional", but it could be any small phrase. This text should be in the appropriate language in the file, properly encoded. Unused if "Virtual". |
| | | description | Help information for the parameter. Unused if "Virtual" or "Literal." |
| | | parameterIdentifier | "q" - What defines this parameter in the final URL (used for both parsing and creating the final calculation formula). This is needed for both "Parameter" and "Virtual" elements. |
| | | alwaysPresent | "true" (in all languages) - The Identifier is always included in the calcs and final URLs even if the parameter's value is still empty.<br>"False" (in all languages) - The identifier is not included in the calculations and final URLs even |

TABLE I-continued

Examples of Element Tags and Attributes

| Element Tag Name | Element Value | Attribute Names | Attribute Values |
| --- | --- | --- | --- |
| <URLVirtualParameter> | (content is reserved and is currently ignored) <WebsiteURLTemplateList> <WebsiteURLTemplate...> <URLElement...> <URLVirtualParameter...> | virtualSeparator | if the parameter's value is still empty. If missing, assumes "True." For "Virtual" elements this defines the text placed in between each URLVirtualParameter when the URL is assembled for the browser. It can be empty. Only used for "Virtual" elements. If missing, assumes ","[comma]. (This node only resides within the content of a URLElement of type "Virtual") |
| | | label | "Address" |
| | | description | Help information for the parameter. |
| | | userHint | A supplementary informational label associated with the parameter edit as a "hint" to the user. Usually this will be something like "Required" or "Optional", but it could be any small phrase. This text should be in the appropriate language in the file, properly encoded. |

Referring to Table I, the element tag name <WebsiteURLTemplateList> is a document container tag. The content for this tag is a single level list of website templates having tag names <WebsiteURLTemplate . . . >. The content of a given <WebsiteURLTemplate . . . > are its URL elements having tag names <URLElements . . . >, which are listed in order of assembly. The grammar described above is represented by the framework

```
<WebsiteURLTemplateList>
    <WebsiteURLTemplate...>
    ...
    <URL Element...>
    ...
```

In some implementations, each website template having a tag name <WebsiteURLTemplate . . . > can include the following attributes: name, description, baseURL, parameterIndicator and parameterSeparator.

A value for the name attribute can be the name of the website corresponding to the website template. If no value is assigned to the name attribute, then the website template can be ignored and not displayed in the setup dialog.

The value for the description attribute can be a string describing the website or providing any other desired information.

A value of "=" for the attribute parameterindicator indicates what separates a name from its value in a name/value pair (the whole parameter). For example, "price=123". If "=" is missing then "=" can be assumed.

A value of "&" for the attribute parameterseparator indicates what separates name/value pairs (the whole parameter). For example, "price=123&locatiom=santaclara". If "&" is missing then "&" can be assumed.

The <URLElement> tag can reside as content within a <WebsiteURLTemplate>. In some implementations, the attributes for this tag can include: type, label, userHint, description, parameterIdentifier, alwaysPresent, virtualSeparator.

For this example, there can be three types of elements: Literal, Parameter and Virtual. A Literal element is the part of the URL that is unchanging static text within the URL. A Parameter element is a parameter for the CGI for the URL, which is shown in the setup dialog with its own edit box. Note that most CGIs will have individual parameters. A Virtual element is the part of the URL that is a single parameter for the CGI, but the setup dialog will display it in parts as if the single parameter was multiple parameters. Note that Virtual elements will typically be used when the CGI expects more than one kind of value in a single parameter. If a value is missing for the type attribute, then a Literal element can be presumed.

The label attribute can represent the name for the parameter displayed in the setup dialog (e.g., label 116). This attribute can be ignored for Literal and Virtual elements. The text for this label should be in the appropriate language and properly encoded.

The userHint attribute provides a supplementary information label in the setup dialog which is associated with a parameter to provide a "hint" to a user. Examples are the panes 216, 218, shown in FIG. 2B. The userHint can indicate whether the parameter is required or optional, or it can be a phrase providing information or instructions to the user.

The description attribute provides information for a parameter and is unused for Literal and Virtual elements. If a help dialog (e.g., "ToolTips" in FileMaker®) is available, then the attribute can be used with the help dialog.

The parameteridentifier attribute defines the parameter in the final URL (i.e., the parameter name in the URL should immediately follow, and be separated by other parameters, by a "&" character in the final URL). This attribute can be used with Parameter and Virtual elements.

The alwaysPresent attribute can be a Boolean operator that is set to "True" if the parameteridentifier is always included in the calculated expression and final URLs even if the parameter's value is still empty. It can be set to "False" if the parameterndentifier is not included in the calculated expression and final URL even if the parameter's value is still empty.

For Virtual elements, the virtualseparator defines the text placed between each <URLVirtualParameter> when the URL is assembled for the web viewer. It can be empty. This attribute is used for Virtual elements. If it is missing, a "," [comma] can be assumed.

In some implementations, the <URLVirtualParameter> element tag can include three attributes: label, description and userHint. The label provides a label for a sub-parameter displayed in the setup dialog. The description attribute provides help information for the sub-parameter, and can be used with a help dialog. The userHint attribute provides supplementary information associated with the parameter. Examples are the panes 216, 218, shown in FIG. 2B. The userHint can indicate whether the parameter is required or optional, or it can be a phrase providing information or instructions to the user.

The grammar described above provides a framework for developing custom templates. If the grammar is followed, users can create custom templates and be assured that they will be operable in the web viewer. The grammar can be extended or reduced as necessary to accommodate a variety of URL grammars.

User System Architecture

Figure 6:
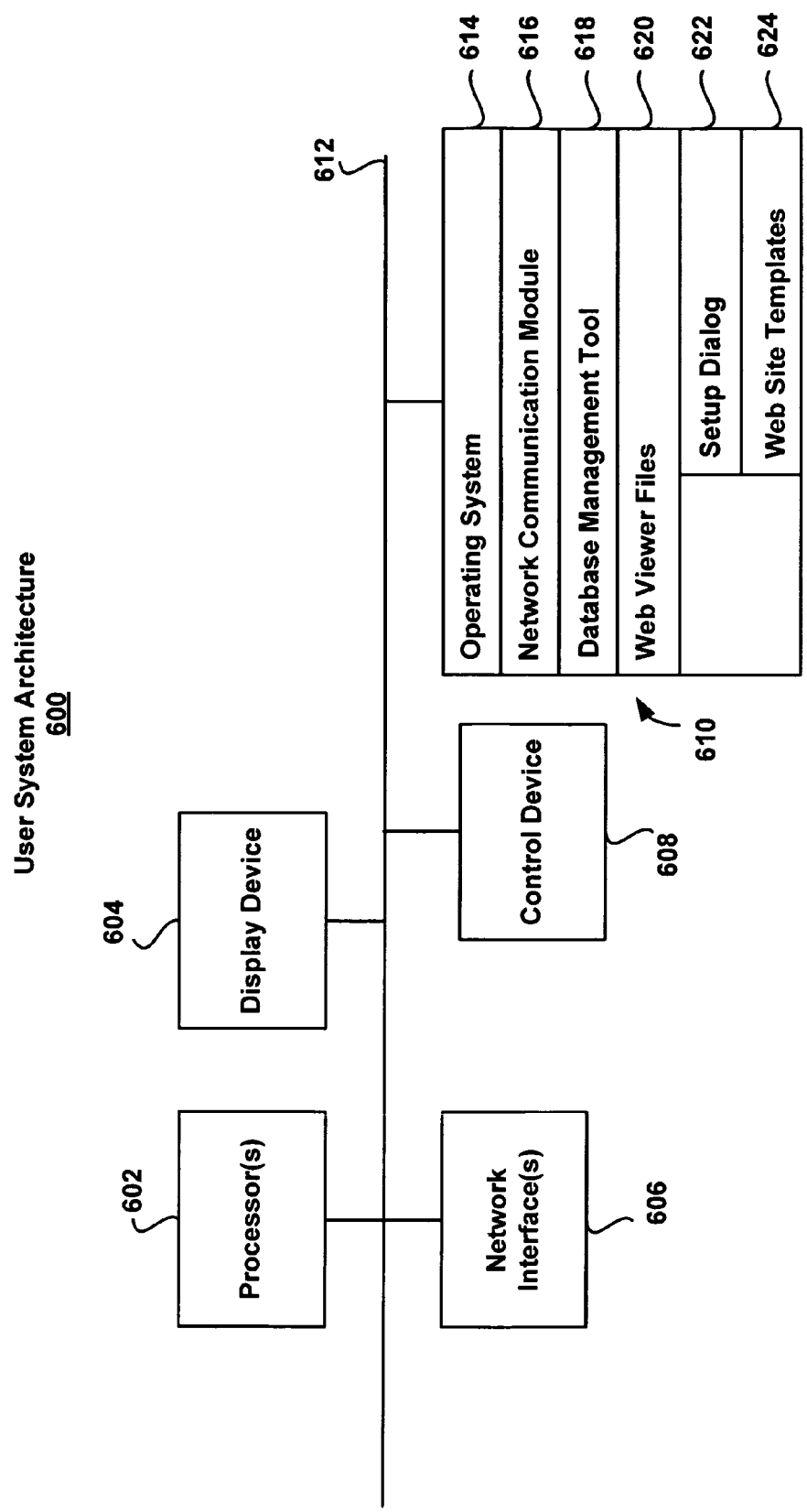
FIG. 6 is a block diagram of an implementation of a user system architecture for hosting a database development tool that includes a web viewer setup dialog.

FIG. 6 is a block diagram of an implementation of a user system architecture 600 for hosting a database development tool that includes a web viewer setup dialog. Other architectures are possible, including architectures with more or fewer components.

In some implementations, the user system architecture 600 includes one or more processors 602 (e.g., dual-core Intel® Xeon® Processors), a display device 604 (e.g., an LCD), a network interface 606 (e.g., a Ethernet, USB, Firewire®), one or more control devices 608 (e.g., mouse, keyboard) and one or more computer-readable mediums 510 (e.g., RAM, ROM, SDRAM, hard disk, optical disk, flash memory, SAN, etc.). These components can exchange communications and data over one or more buses 612 (e.g., EISA/ISA, PCI, PCI-Express) for facilitating the transfer of data and control signals between the components and subsystems of the architecture 600.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 610 further includes an operating system 614 (e.g., Mac OS®, Windows® XP, Linux® OS), a network communication module 616 and a database development tool 618 (e.g., FileMaker®). The operating system 614 can be multi-user, multiprocessing, multitasking, multithreading, real time, etc. The operating system 614 performs basic tasks, including but not limited to: recognizing input from the control devices 608 and providing output to the display device 604; keeping track and managing files and directories on computer-readable mediums 610 (e.g., memory or a storage device); controlling peripheral devices (e.g., printers, external storage devices); and managing traffic on the one or more buses 612. The network communications module 616 includes various components for establishing and maintaining network connections with network devices (e.g., software for implementing communication protocols, such as TCP/IP, HTTP, wireless protocols, etc.).

The database management tool 618 includes web viewer files 620 for creating a web viewer object in a layout for allowing users to have access to websites from within a database. The web viewer files 602 include code for generating a web viewer setup dialog 622 and one or more web site templates 624. The web viewer setup dialog 622 and the website templates were described with reference to FIGS. 1-5. In addition to default website templates, the user can create custom website templates using the URL grammar described with reference to Table I. The database development tool 618 can include multiple software components or it can be a single body of code.

Various modifications may be made to the disclosed implementations and still be within the scope of the following claims.

What is claimed is:

1. A computer-implemented method for building a web address, comprising:

presenting a setup dialog in a single window on a display device, the setup dialog having a website listing area, a parameter edit area, and a web address edit area;

displaying in the website listing area a list of websites, each of the websites having a corresponding website Uniform Resource Locator (URL) template for building a web address expression for a web address for the website within the setup dialog;

receiving a first input through the setup dialog in the website listing area, the first input specifying a website from the list of websites;

automatically determining a list of parameters of the web address for the website based on the corresponding website URL template of the website;

presenting the list of parameters in the setup dialog in the parameter edit area;

for each parameter presented in the parameter edit area, generating a corresponding parameter edit input for the parameter;

receiving a second input through the setup dialog in a parameter edit input for a first parameter, the second input specifying a value for the first parameter; and building the web address expression dynamically in the web address edit area, the web address expression including the first parameter set to the specified value.

2. The method of claim 1, where receiving the second input specifying a value further comprises:

specifying the value to be a database record field that includes literals for building one or more corresponding web addresses from the web address expression; and wherein the web address expression is an expression from which a plurality of web addresses for the web address can be generated, each of the web addresses having the first parameter equal to a corresponding literal in the database record field.

3. The method of claim 1, further comprising:

presenting instructions in the setup dialog for building the web address expression.

4. The method of claim 1, further comprising:
presenting information in the setup dialog indicating if the parameter is required or optional for the web address that is generated from the web address expression.

5. The method of claim 1, further comprising:
presenting a static portion of the web address in the web address expression in the web address edit area of the setup dialog.

6. The method of claim 1, where presenting the setup dialog further comprises:
defining a web viewer object in a database layout;
presenting the website URL template of the corresponding website to the web viewer object; and
presenting the setup dialog after the web viewer object is defined with the list of parameters for the website based on the corresponding website URL template of the website presented in the parameter edit area.

7. The method of claim 1, further comprising:
providing the setup dialog localized to a specific language.

8. The method of claim 1, where presenting the parameter in the setup dialog further comprises:
presenting the list of parameters in the setup dialog in accordance with grammar associated with the website URL template, the grammar associated with the website URL template including:
a website URL template tag structure that contains the website URL template; and
a URL element tag structure that specifies one of a literal string or a parameter for a common gateway interface associated with the web address.

9. A computer-readable hardware storage medium having instructions stored thereon, which, when executed by a processor, causes the processor to perform operations for building a web address, the operations comprising:
presenting a setup dialog in a single window on a display device, the setup dialog having a website listing area, a parameter edit area, and a web address edit area;
displaying in the website listing area a list of websites, each of the websites having a corresponding website Uniform Resource Locator (URL) template for building a web address expression for a web address for the website within the setup dialog;
receiving a first input through the setup dialog in the website listing area, the first input specifying a website from the list of websites;
automatically determining a list of parameters of the web address for the website based on the corresponding website URL template of the website;
presenting the list of parameters in the setup dialog in the parameter edit area; for each parameter presented in the parameter edit area, generating a corresponding parameter edit input for the parameter;
receiving a second input through the setup dialog in a parameter edit input for a first parameter, the second input specifying a value for the first parameter; and
building the web address expression dynamically in the web address edit area, the web address expression including the first parameter set to the specified value.

10. The computer-readable storage medium of claim 9, where receiving the second input specifying a value further comprises:
specifying the value to be a database record field that includes one or more literals for building one or more corresponding web addresses from the web address expression; and
wherein the web address expression is an expression from which a plurality of web addresses for the web address can be generated, each of the web addresses having the first parameter equal to a corresponding literal in the database record field.

11. The computer-readable storage medium of claim 9, the operations further comprising:
presenting instructions in the setup dialog for building the web address expression.

12. The computer-readable storage medium of claim 9, the operations further comprising:
presenting information in the setup dialog indicating if the parameter is required or optional for the web address that is generated from the web address expression.

13. The computer-readable storage medium of claim 9, the operations further comprising:
presenting a static portion of the web address in the web address expression in the web address edit area of the setup dialog.

14. The computer-readable storage medium of claim 9, where presenting the setup dialog further comprises:
defining a web viewer object in a database layout;
presenting the website URL template of the corresponding website to the web viewer object; and
presenting the setup dialog after the web viewer object is defined with the list of parameters for the website based on the corresponding website URL template of the website presented in the parameter edit area.

15. The computer-readable storage medium of claim 9, the operations further comprising:
providing the setup dialog localized to a specific language.

16. The computer-readable storage medium of claim 9, where presenting the parameter in the setup dialog further comprises:
presenting the list of parameters in the setup dialog in accordance with grammar associated with the website URL template, the grammar associated with the website URL template including:
a website URL template tag structure that contains the website URL template; and
a URL element tag structure that specifies one of a literal string or a parameter for a common gateway interface associated with the web address.

17. A system, comprising:
a display device;
a processor; and
a computer readable hardware storage medium storing instructions executable by the processor and upon such execution cause the processor to perform operations for building a web address, the operations comprising:
presenting a setup dialog in a single window on a display device, the setup dialog having a website listing area, a parameter edit area, and a web address edit area;
displaying in the website listing area a list of websites, each of the websites having a corresponding website Uniform Resource Locator (URL) template for building a web address expression for a web address for the website within the setup dialog;
receiving a first input through the setup dialog in the website listing area, the first input specifying a website from the list of websites;
automatically determining a list of parameters of the web address for the website based on the corresponding website URL template of the website;
presenting the list of parameters in the setup dialog in the parameter edit area;
for each parameter presented in the parameter edit area, generating a corresponding parameter edit input for the parameter;

receiving a second input through the setup dialog in a parameter edit input for a first parameter, the second input specifying a value for the first parameter; and building the web address expression dynamically in the web address edit area, the web address expression including the first parameter set to the specified value.

18. The system of claim 17, wherein:

the value is a database record field that includes one or more literals for building one or more corresponding web addresses from the web address expression;

the web address expression is an expression from which a plurality of web addresses for the web address can be generated, each of the web addresses having the first parameter equal to a corresponding literal in the database record field; and the list of parameters are presented in the setup dialog in accordance with grammar associated with the website URL template stored in the computer readable medium hardware, the grammar associated with the website template including:

a website URL template tag structure that contains the website URL template; and a URL element tag structure that specifies one of a literal string or a parameter for a common gateway interface associated with the web address.

* * * * *

UNITED STATES PATENT AND TRADEMARK OFFICE
CERTIFICATE OF CORRECTION

| | | |
|---|---|---|
| PATENT NO. | : 7,805,464 B2 | |
| APPLICATION NO. | : 11/523378 | |
| DATED | : September 28, 2010 | |
| INVENTOR(S) | : David McKee et al. | |

It is certified that error appears in the above-identified patent and that said Letters Patent is hereby corrected as shown below:

In column 6, line 5, delete "FileMaker()" and insert -- FileMaker® --, therefor.

In column 8, line 28, delete "in F the URL." and insert -- in the URL. --, therefor.

In column 13, line 10, delete "parameterndentifier" and insert -- parameteridentifier --, therefor.

Signed and Sealed this
Fifteenth Day of November, 2011

David J. Kappos
*Director of the United States Patent and Trademark Office*